United States Patent [19]

Davies

[11] Patent Number: 6,088,478
[45] Date of Patent: Jul. 11, 2000

[54] METHOD AND APPARATUS FOR DISTINGUISHING BOLD FACE CHARACTERS

[75] Inventor: Daniel Davies, Palo Alto, Calif.

[73] Assignee: Xerox Corporation, Stamford, Conn.

[21] Appl. No.: 09/023,117

[22] Filed: Feb. 13, 1998

[51] Int. Cl.$^7$ ....................................................... G06K 9/00
[52] U.S. Cl. ............................................................. 382/168
[58] Field of Search ........................... 382/168, 170–173, 382/182, 185, 192, 194–200, 243, 245

[56] References Cited

U.S. PATENT DOCUMENTS

| | | | |
|---|---|---|---|
| 5,668,891 | 9/1997 | Fan et al. | 382/168 |
| 5,778,095 | 7/1998 | Davies | 382/225 |

*Primary Examiner*—Joseph Mancuso
*Assistant Examiner*—F. E. Cooperrider
*Attorney, Agent, or Firm*—Oliff & Berridge, PLC

[57] ABSTRACT

A method and apparatus for classification of scanned symbols into equivalence classes as may be used for image data compression. The present invention performs run-length symbol extraction and classifies symbols based on both horizontal and vertical run length information. An equivalence class is represented by an exemplar. Feature-based classification criteria for matching an exemplar is defined by a corresponding exemplar template. The feature-based classification criteria all use quantities, which includes the stroke width of symbols, that can be readily computed from the run endpoints. Reducing the number of equivalence classes is achieved through a process called equivalence class consolidation. Equivalence class consolidation utilizes the symbol classifier to identify matched exemplars indicating equivalence classes which may be merged. For a consolidated equivalence class, the exemplar matching the most symbols is selected as the representative for the class.

26 Claims, 3 Drawing Sheets

```
201-1            X X X X X
202-2          X           X
203-3        X X           X X
204-4        X X           X X
205-5        X X           X X
206-6          X           X
207-7            X X X X X
```
FIG.2
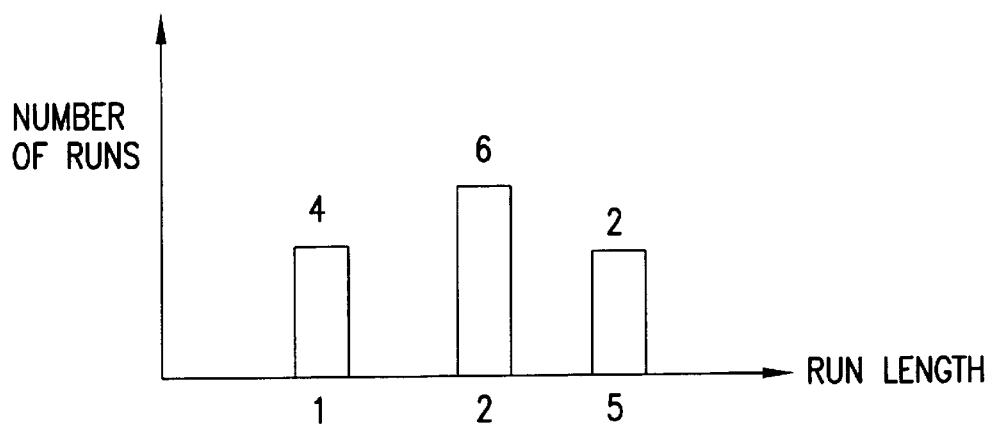
FIG.3
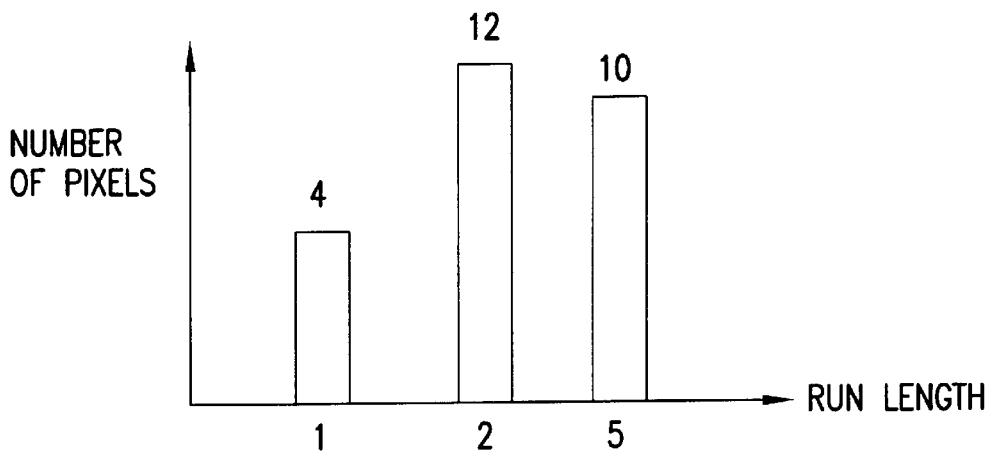
FIG.4

METHOD AND APPARATUS FOR DISTINGUISHING BOLD FACE CHARACTERS

BACKGROUND OF THE INVENTION

1. Field of Invention

This invention is related to compression of scanned text images. In particular, this invention relates to determining the stroke width of a symbol for use in symbol identification.

2. Background

A major stumbling block to the common use of digitized images is their size. An 8.5"×11" image at a resolution of 300 dots per inch (dpi) contains roughly 8 million pixels. Although binarization of a scanned image reduces the number of bits per pixel to one, this still requires one megabyte of memory to store. Compression techniques are typically characterized as lossless or lossy. In lossless compression, no data is lost in the compression and subsequent decompression. In lossy compression, a certain amount of data is lost. However, this loss is considered acceptable since the essence of the compressed data is retained after decompression.

Common lossless compression techniques for binary images, like CCITT Group 3 or Group 4, can compress a binary image by factors of 10 to 20. The resulting file size is unacceptably large when compared to the synthetic electronic form used to create a comparable image.

Most documents contain text. One way to compress the text of a binary image is to perform optical character recognition to create a text stream, compress the text stream using one text compression scheme and store the results. Unfortunately, the mistakes made in selection of character, font, face and position during optical character recognition are often objectionable.

Commonly assigned U.S. Pat. Nos. 5,778,095 and 5,818,965, each incorporated herein by reference in their entirety, disclose methods and apparatus for classifying symbols extracted from a scanned document into equivalence classes. An equivalence class is a set of symbols found in an image, where each symbol in the class can be substituted for another symbol in the class without changing the appearance of the image in an objectionable way. An equivalence class is represented by an exemplar. An exemplar of an equivalence class is a symbol that will be substituted for every member of the equivalence class when the image is decompressed or otherwise recreated.

The systems and methods disclosed in these applications perform run-length symbol extraction and classify the symbols into equivalence classes based on both horizontal and vertical run length information. Feature-based classification criteria for matching an extracted symbol to an exemplar is defined by a corresponding exemplar template. The exemplar template includes a plurality of horizontal and vertical template groups, each defining criteria for matching one or more symbol runs. The feature-based classification criteria use quantities that can be readily computed from the run endpoints.

Specifically, the process of matching template groups with symbol runs is identical for both horizontal/vertical template groups and horizontal/vertical symbol runs. Accordingly, the hereinafter described steps apply to both horizontal and vertical runs. The first step is to determine what the distance is between the symbol's horizontal/vertical axis and its bottom row/left column (called value X) and the corresponding distance in the exemplar (called value Y). These measurements are used to determine whether or not alignment rows/columns are added to the symbol or exemplar. If X−Y>1, is true, then an alignment row/column is added to the symbol. In other words with respect to the horizontal runs, if the symbol's axis is at least 1 row closer to its bottom row than the exemplar axis is to its bottom row, start with the symbol's alignment row to align symbol with exemplar. Conversely, if Y−X>1 is true, then an alignment row/column is added to the exemplar. In other words, if the exemplar's axis is at least 1 row closer to its bottom row than the symbol's axis is to its bottom row, start with the alignment row of the exemplar. Note that this corresponds to a duplicated set of the template groups used for matching the bottom row of the symbol to the exemplar.

The processing proceeds with templates and symbol runs starting at the bottom row, right column of each exemplar. A template group is obtained. It is then determined if the current run(s) in the symbol run list matches the template group criteria. As described above, more than one run can be required to match the criteria for a template group, and the match criteria is specified by the group type. If the template criteria is not met by a run in the run list, the processing continues to get a next exemplar. If the criteria is met, the runs matching the template group are consumed and the next run in the run list becomes the current run. This is to make sure that all runs match some template of the exemplar. If the symbol is small, round and dense, alignment and noise checks are performed for the row. This check is the accumulation of differences in adjacent row offsets when the current row has a non-zero adjacent row offset.

It is then determined if more template groups need to be checked. If not, it is determined if the symbol run list has been exhausted. If not, no match has occurred and the processing continues to get a next exemplar. For small, round and dense symbols, if the run list has been has been exhausted, it is determined if the accumulated offset difference is greater than a predetermined threshold. In the currently preferred embodiment, the predetermined threshold is ¾ of the height (¾ of the width when comparing vertical runs). If it is not a small, round and dense symbol or the predetermined threshold is not exceeded, a match has occurred and processing continues to code the symbol. If it is exceeded, the processing continues to get a next exemplar.

The feature-based classification criteria also include size, number of black pixels (mass), number of black pixels that are not on the edge (interior), a measure of the slant of the symbol, and measures of roundness and squareness (volume). Using these measures in addition to shape-based measures produces acceptable results.

SUMMARY OF THE INVENTION

However, shape-based schemes have trouble distinguishing bold face characters from non-bold face characters. In smaller characters, the stroke of a bold character is often only one pixel wider than a normal character. Since the disclosed method must be able to tolerate at least one pixel of noise, a simple shape-based measure cannot always distinguish bold face from non-bold face small characters.

In the incorporated applications, the total number of black pixels or the mass of a character is measured to determine whether the character is a bold face character or a non-bold face character. While making all of the strokes in a character one pixel wider changes each horizontal slice of the character by very little, this adds up to a large change in the total number of pixels. Unfortunately, many factors effect the total number of pixels in a symbol, including noise. Thus, setting the tolerances close enough to reliably distinguish small, noisy bold characters from small, noisy non-bold characters results in a fairly large set of character classes. This problem was partially solved by only performing this measurement on small characters. However, this had an unfortunate effect of failing to distinguish large bold and non-bold characters. Thus, a more efficient method for distinguishing bold and non-bold characters is needed.

This invention provides a method and apparatus for distinguishing bold and non-bold characters.

This invention also provides an improved method for classifying scanned symbols into equivalence classes.

The method and apparatus of this invention perform run-length symbol extraction and classify symbols based on both horizontal and vertical run-length information. Instead of only measuring the mass of each character, as disclosed in the incorporated applications, the method and apparatus of this invention measures the stroke width of each character to determine whether the character is bold or non-bold.

Stroke width measurement also provides a more efficient method for distinguishing very small punctuation marks. Conventionally, determining the number of interior pixels was necessary to distinguish one small punctuation mark from another small punctuation mark. Since the total number of pixels and the size of different small punctuation marks are the same, determining the number of non-edge pixels was necessary to distinguish symbols having tails, such as commas and apostrophes, from symbols of roughly the same size. Since measuring the stroke width of a character provides a more efficient method of determining the shape of small characters, determining the number of interior pixels of a small symbol to distinguish from another small symbol is no longer necessary.

More particularly, this invention is directed to distinguishing bold-face symbols from normal face symbols in scanned text images using the stroke width of the symbols. A preferred method of the invention includes scanning a symbol, generating histograms of the symbol, summing the pixels from the histograms, summing the number of runs used in the pixel sum, and using the two sums to determine the stroke width of the symbol.

BRIEF DESCRIPTION OF THE DRAWINGS

The preferred embodiments of this invention will be described in detail, with reference to the following figures, wherein:

FIG. 2 illustrates horizontal runs of a symbol;

FIGS. 3 and 4 are histograms of the pixel run count of the symbol shown in FIG. 2.

DETAILED DESCRIPTION OF PREFERRED EMBODIMENTS

Figure 1:
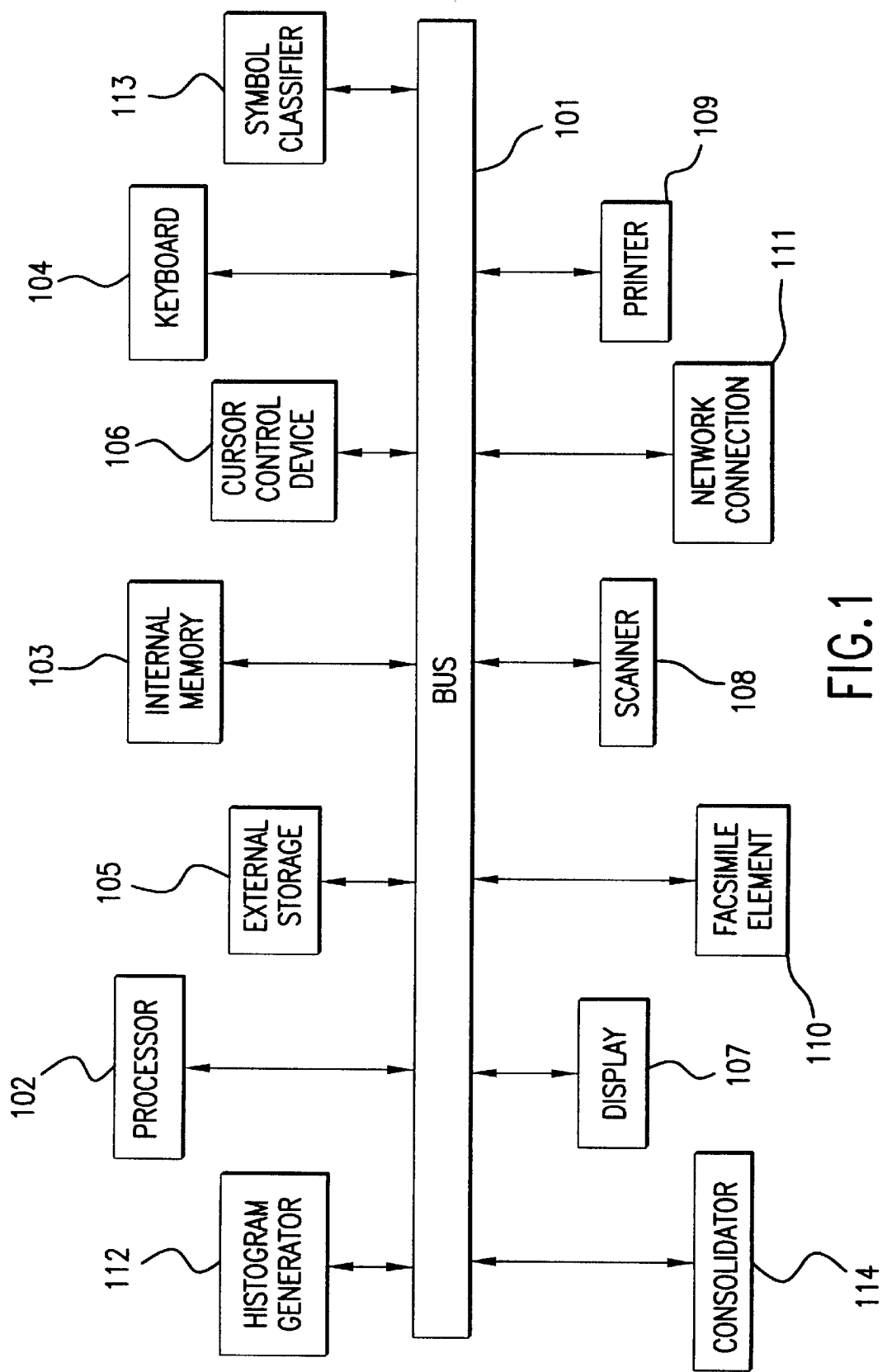
FIG. 1 is a block diagram of an apparatus which performs the invention.

A computer based system which performs this invention is described with reference to FIG. 1. Referring to FIG. 1, the computer based system includes a plurality of components coupled via a bus 101. The bus 101 illustrated here is simplified in order not to obscure the present invention. The bus 101 may include a plurality of parallel buses (e.g., address, data and status buses) as well as a hierarchy of buses (e.g., a processor bus, a local bus and an I/O bus). The computer system further includes a processor 102 for executing instructions provided via the bus 101 from an internal memory 103. Such instructions are those that are preferably implemented in software for carrying out the processing steps outlined in the flowchart of FIG. 5 and the flowcharts contained in the incorporated applications. The software is preferably written in the C programming language. The functions of the histogram generator 112, the symbol classifier 113, and the consolidator 114 may be performed by software or other means known in the art. The internal memory 103 is typically a combination of RAM and/or ROM. The processor 102 and internal memory ROM 103 may be discrete components or a single integrated device such as an application specific integrated circuit (ASIC) chip.

Also coupled to the bus 101 are a keyboard 104 for entering alphanumeric input, an external storage 105 for storing data, a cursor control device 106 for manipulating a cursor, and a display 107 for displaying visual output. The keyboard 104 would typically be a standard QUERY keyboard but may also be a telephone-like keypad. The external storage 105 may be a fixed or removable magnetic or optical disk drive. The cursor control device 106 will typically have a button or switch associated with it to which the performance of certain functions can be programmed. Further coupled to the bus 101 is a scanner 108. The scanner 108 provides a means for creating a bit-mapped representation of a medium (i.e., a scanned document image).

Optional elements that could be coupled to the bus 101 include a printer 109, a facsimile element 110 and a network connection 111. The printer 109 could be used to print the bit-mapped representation. The facsimile element 110 may contain an element used to transmit image data that has been compressed using the present invention. Alternatively, the facsimile element 110 could include an element for decompression of a document image compressed using the present invention. The network connection 111 would be used to receive and/or transmit data containing image data. Thus, the image data utilized by the present invention may be obtained from the scanner 108, via a received fax or over a network.

The histogram generator 112 generates histograms of extracted symbols. The symbol classifier 113 classifies the extracted symbols into equivalence classes which are represented by unique exemplars. The number of created equivalence classes, will normally be less than the total number of symbols extracted. The created output scheme includes exemplar ID/position pairs followed by a dictionary of the exemplars.

The consolidator 114 consolidates the set of equivalence classes by reducing the number of equivalence classes and compresses the image data by reducing the size of the dictionary. The manner in which consolidation occurs is nearly identical to the way in which symbols are compared to exemplars. In general, the more work expended to match symbols, the more matches that will be found. For the sake of efficiency, this extra effort may be more efficiently performed on the relatively small set of equivalence classes rather than performing it on the entire set of raw symbols.

When the image is decompressed, each of the exemplar ID/position pairs is processed so that an identified exemplar is placed at a specified location. This continues for all of the pairs. Because exemplars are substituted for the original symbol in the matching process, this type of compression is termed lossy compression. Despite this substitution, the essence of the image will remain.

The symbol classifier 113 analyzes runs representing the symbol rather than bitmaps to directly classify the symbol.

The symbol classifier 113 still uses symbol features like width and height for classification. For more detailed symbol features, the symbol classifier 113 compares the position of each symbol run endpoint with a corresponding range of legal endpoint locations computed by looking at a corresponding group of three adjacent scan lines in an exemplar. To achieve sufficient accuracy, vertical runs are produced from the horizontal runs and both sets of runs are used in classification.

As shown in FIG. 1, the computer-based system is preferably implemented on a programmed general purpose computer. However, the computer-based system can also be implemented on a special purpose computer, a programmed microprocessor or microcontroller and peripheral integrated circuit elements, an ASIC or other integrated circuit, a hard-wired electronic or logic circuit such as a discrete element circuit, a programmable logic device such as a PLD, PLA, FPGA or PAL, or the like. In general, any device which is capable of complementing a finite state machine capable of implementing the methods of this invention, can be used to implement the computer-based system.

Feature-based classification criteria use quantities that can be readily computed from the run endpoints. The availability of these endpoints makes the generation of numerical measures of the symbol much easier than it would be with bitmaps. The feature-based classification criteria are: individual symbol width and height; equivalence class width and height; stroke width; slant; and horizontal and vertical volumes.

Symbol width and height are specified by a bounding box surrounding the symbol. The symbol width and height are used to select a subset of the equivalence classes to compare against and to decide which symbol feature tests to apply. In the currently preferred embodiment, the equivalence class exemplar must be within the range of plus or minus two pixels of the symbol width and height in order to be eligible for comparison.

The most basic tests are adequate for distinguishing large symbols. On smaller symbols, subtle features become important so more tests are needed. Small symbols are generally defined as those having a width or height of 20 or fewer pixels.

The determination of the equivalence class width and height range is used in two ways. First, since very small symbols have a smaller range of matching widths and heights, minimum and maximum allowable widths and heights are recorded with each class. Symbols outside these ranges cannot be included in the class. Second, the width and height ranges are used when performing equivalence class consolidation. This determination provides a minimum and maximum allowable width and height for each consolidated class.

When determining the stroke width of a character or symbol, the vertical runs and the horizontal runs are analyzed. Since the analysis of the horizontal runs is identical to the analysis of the vertical runs, only the analysis of the horizontal runs is illustrated and described. A horizontal run is a continuous row of pixels of one state. FIG. 2 shows the horizontal runs of an "o" formed in scan lines 201–207. The horizontal runs in the scan lines 201 and 207 each contain 5 pixels, the four horizontal runs in the scan lines 202 and 206 each contain 1 pixel, and the horizontal runs in scan lines 203–205 each contain 2 pixels. The horizontal runs of short length namely the horizontal runs in the scan lines 202–206, represent the vertical strokes of the character.

FIG. 3 shows a histogram of the symbol shown in FIG. 2. The histogram is indexed by run length and contains the number of runs of that length. FIG. 4 also shows a histogram of the symbol shown in FIG. 2. This histogram is indexed by the run length and contains the total number of pixels in runs of that length. The number of total pixels of a run length is the run length multiplied by the number of runs in that length.

Starting from the shortest run length and proceeding towards the longest run length, for each run length the total number of pixels in runs of that length are added to a first running sum. The first running sum will stop when it becomes a sufficiently large fraction of the total mass of a symbol. The total mass of a symbol is the total number of black pixels needed to represent the symbol. Preferably, the running sum stops when the first running sum becomes at least equal the total mass. However, the running sum can be stopped based on other criteria.

A second running sum is calculated by summing the total number of runs used to determine the first running sum. The stroke width of the character equals the first running sum divided by the second running sum. An extracted symbol will be categorized into a particular equivalence class only if the stroke width of the extracted symbol and the exemplar of the equivalence class differs by no more than 0.5 pixels. If the stroke widths were allowed to vary by an entire pixel, any amount of erosion of a bold face symbol or any fattening of a normal symbol would allow them to match.

Using the symbol shown in FIG. 2 as an example, the mass equals 26 and the first running sum equals 16. The first running sum is stopped after adding the number of pixels in runs having run lengths of 1 and 2 since 16 is greater than one-half the total mass of 26. For this example, the second running sum equals 10. The second running sum equals the sum of the number of runs having run lengths of 1 and 2. Thus, the stroke width of the symbol shown in FIG. 2 equals 16/10 or 1.60.

In a preferred method of the invention the processor 102 directs the scanner 108 to scan a symbol contained in an image document. The processor 102 directs the histogram generator 112 to generate a first histogram of the symbol indexed by run length and contains the number of runs of that length, and a second histogram of the symbol indexed by run length and contains the total number of pixels in runs of that length. The processor 102 determines the total mass, the first running sum, the second running sum, and the stroke width of the symbol. The processor 102 directs the symbol classifier 113 to categorize the symbol into an equivalent class or creates a new equivalent class.

Figure 5:
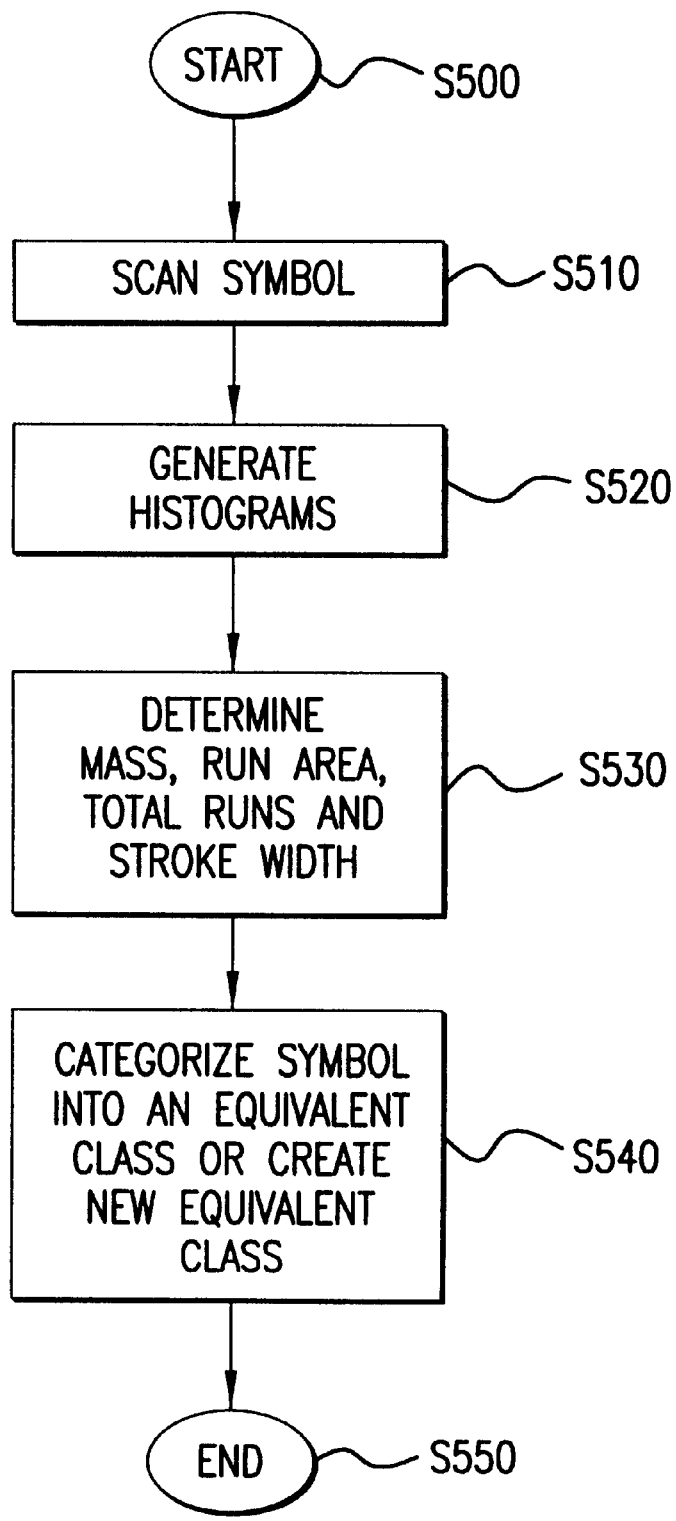
FIG. 5 illustrates a preferred method of this invention.

A preferred method of the invention is described with reference to FIG. 5.

The method starts in step S500. In step S510, a symbol contained in an image document is scanned. In step S520, the first histogram of the symbol indexed by run length and containing the number of runs of that length, and a second histogram of the symbol indexed by run length and containing the total number of pixels in runs of that length are generated. In step S530, the total mass, the first and second running sums, and the stroke width of the symbol are determined. In step S540, the symbol is categorized into an equivalent class or a new equivalent class is created. In step S550, the method ends.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for determining stroke width of symbols contained in binary encoded image data, comprising:
   extracting a symbol;
   creating histograms of the extracted symbol;
   determining a total mass of the extracted symbol;
   summing a number of pixels from selected histogram groups;
   summing a number of runs used to determine the number of pixels; and
   determining the stroke width of the extracted symbol based on the number of pixels and the number of runs.

2. The method of claim 1, wherein the number of pixels is a fraction of the total mass of the extracted symbol.

3. The method of claim 1, wherein the number of pixels is at least equal to one half of the total mass.

4. The method of claim 1, wherein the stroke width of the extracted symbol equals the number of pixels divided by the number of runs.

5. A method for classifying symbols contained in binary encoded image data comprising:
   extracting a run-length encoded representation of a symbol;
   determining a stroke width and symbol features of the extracted symbol from the run-length encoded representation;
   selecting a set of equivalence classes from a dictionary, the dictionary comprising equivalence classes created from previously extracted symbols, wherein each equivalence class is represented by an exemplar, each exemplar comprising templates, and each template comprising information about the exemplar;
   comparing at least the stroke width of the extracted symbol with the templates of each of the exemplars of each of the set of equivalence classes until a match is found or until all exemplars have been compared with;
   indicating the extracted symbol is in the equivalence class of the exemplar being compared or creating a new equivalence class based on the comparison, if the comparison yields a match;
   creating a new equivalence class with said extracted symbol as the exemplar, if the comparison does not yield a match; and
   adding said new equivalence class to the dictionary.

6. The method of claim 5, further comprising:
   determining a size of the extracted symbol; and
   selecting equivalence classes having a size within a predetermined tolerance of the extracted symbol size.

7. The method of claim 5, further comprising:
   determining if a first set of symbol features and the stoke widths are within corresponding threshold ranges specified in the templates of an exemplar being compared;
   indicating that the extracted symbol does not match the exemplar being compared, if any of the first set of symbol features or the stroke widths are not within the threshold ranges; and
   determining if runs in the extracted symbol satisfy run endpoint criteria specified in the template of the exemplar being compared to, if all the first set of symbol features and the stroke widths are within the threshold ranges.

8. The method of claim 5, further comprising:
   determining if the extracted symbol is small;
   determining if a second set of symbol features are within corresponding threshold ranges specified in the templates of the exemplar being compared, if the extracted symbol is small; and
   indicating that the extracted symbol does not match the exemplar being compared, if any of the second set of symbol features are not within the threshold ranges.

9. The method of claim 8, wherein the second set of symbol features comprises a symbol horizontal volume and symbol vertical volume.

10. The method of claim 5, wherein the first set of symbol features comprises symbol height, symbol width and symbol slant.

11. The method of claim 5, further comprising:
    generating vertical runs and horizontal runs of the extracted symbol; and
    comparing endpoints of the vertical and horizontal runs with endpoints of vertical and horizontal runs of the exemplar being compared to determine if a match exists.

12. The method of claim 11, further comprising aligning the vertical and horizontal runs of the extracted symbol with the vertical and horizontal runs of the exemplar being compared.

13. The method of claim 12, further comprising:
    changing the coordinates of the vertical and horizontal runs of the extracted symbol to minimize an effect of dimensional changes caused by noise;
    determining if an alignment row is needed by comparing one of 1) a distance from a horizontal axis to a bottom row of the extracted symbol to a distance from the horizontal axis to the bottom row of the exemplar being compared, and 2) a distance from the horizontal axis to a top row of the extracted symbol to a distance from the horizontal axis to the top row of the exemplar being compared; and
    determining if an alignment column is needed by comparing one of 1) a distance from a vertical axis to a left-most column of the extracted symbol to a distance from the vertical axis to the left-most column of the exemplar being compared, and 2) a distance from the vertical axis to a right-most column of the extracted symbol to a distance from the vertical axis to the right-most column of the exemplar being compared.

14. The method of claim 13, further comprising:
    generating an alignment row from the bottom row of said extracted symbol; and
    generating an alignment column from a left most column of said extracted symbol.

15. The method of claim 13, further comprising:
    changing coordinates of the vertical and horizontal runs of the extracted symbol relative to a center of the extracted symbol; and
    increasing the coordinates by a predetermined factor.

16. The method of claim 5, further comprising:
    creating histograms of the extracted symbol;
    determining a total mass of the extracted symbol;
    summing a number of pixels from selected histogram groups;
    summing a number of runs used to determine the number of pixels; and
    determining the stroke width of the extracted symbol based on the number of pixels and the number of runs.

17. The method of claim 16, wherein the number of pixels is a fraction of the total mass of the extracted symbol.

18. The method of claim 16, wherein the number of pixels is at least equal to one half of the total mass.

19. The method of claim 16, wherein the stroke width of the extracted symbol equals the number of pixels divided by the number of runs.

20. The method of claim 5, wherein the stroke width of the extracted symbol matches a stroke width of an exemplar if the two stoke widths do not differ by more than 0.5 pixel.

21. An apparatus for classifying symbols contained in binary encoded image data comprising:

means for inputting electronic image data;

means for extracting a run-length encoded representation of a symbol;

means for determining a stroke width and symbol features of the extracted symbol from the run-length encoded representation; and a symbol classifier that classifies the extracted symbol into a first equivalent class if the extracted symbol matches an exemplar representing the first equivalent class and that creates a second equivalent class if the extracted symbol does not match the exemplar representing the first equivalent class, based on the stroke width and symbol features.

22. The apparatus of claim 21, further comprising a consolidator that consolidates a set of equivalent classes by reducing the number of equivalent classes.

23. The apparatus of claim 21, further comprising:

a histogram generator that generates histograms of the extracted symbol;

means for determining a total mass of the extracted symbol;

means for summing a number of pixels from selected histogram groups;

means for summing a number of runs used to determine the number of pixels; and means for determining the stroke width of the extracted symbol based on the number of pixels and the number of runs.

24. The apparatus of claim 23, wherein the histogram generator generates a histogram indexed by run length and containing the number of runs of that length, and a histogram indexed by run length and containing the total number of pixels in runs of that length.

25. The apparatus of claim 23, wherein the means for summing pixels starts from the shortest run length, proceeds towards the longest run length, and for each run length, adds the total number of pixels in runs of that length to a running sum.

26. The apparatus of claim 25, wherein the running sum will stop when it becomes a fraction of the total mass of the extracted symbol.

* * * * *